United States Patent
Shoshany et al.

(10) Patent No.: US 7,160,379 B1
(45) Date of Patent: Jan. 9, 2007

(54) HYDROPHOBIC SAND TREATED WITH WAX BLEND

(75) Inventors: Haggai Shoshany, Kfar Tavor (IL); Amnon Shoshani, Tel Aviv (IL)

(73) Assignee: HA Industrial Technologies Ltd., Tel Aviv (IL)

(*) Notice: Subject to any disclaimer, the term of this patent is extended or adjusted under 35 U.S.C. 154(b) by 0 days.

(21) Appl. No.: 11/401,306

(22) Filed: Apr. 11, 2006

Related U.S. Application Data

(60) Provisional application No. 60/670,696, filed on Apr. 13, 2005.

(51) Int. Cl.
*C08L 91/06* (2006.01)
*C08L 91/08* (2006.01)

(52) U.S. Cl. ...................... 106/272; 106/271

(58) Field of Classification Search ............... 106/270, 106/271, 272
See application file for complete search history.

(56) References Cited

U.S. PATENT DOCUMENTS

| | | | | |
|---|---|---|---|---|
| 3,108,441 | A * | 10/1963 | Watson | 405/264 |
| 4,925,493 | A * | 5/1990 | Lamoreaux | 106/272 |
| 5,405,225 | A * | 4/1995 | Bilkenroth et al. | 405/129.65 |
| 5,711,795 | A * | 1/1998 | Browning | 106/271 |
| 5,972,101 | A * | 10/1999 | Korniat et al. | 106/622 |
| 6,235,070 | B1 * | 5/2001 | Beermann | 51/308 |
| 6,821,332 | B1 * | 11/2004 | Hubbs | 106/272 |

* cited by examiner

*Primary Examiner*—David M. Brunsman
(74) *Attorney, Agent, or Firm*—Dekel Patent Ltd.; David Klein

(57) ABSTRACT

A method for making hydrophobic sand including coating sand with a wax blend so as to form a coated sand with advanced hydrophobic properties, wherein a weight ratio of the wax blend to total coated sand weight is about 0.05%–10%, and the wax blend includes a weight ratio of about 50.01% to 99.99% of a main wax, and about 49.99% to 0.01% of a secondary wax.

12 Claims, No Drawings

HYDROPHOBIC SAND TREATED WITH WAX BLEND

CROSS-REFERENCE TO RELATED APPLICATIONS

This application claims priority under 35 USC § 119 to U.S. Provisional Patent Application Ser. No. 60/670,696, filed Apr. 13, 2005, which is incorporated herein by reference.

FIELD OF THE INVENTION

The present invention relates generally to hydrophobic particles, and particularly to using wax blends to impart hydrophobic properties to sand.

BACKGROUND OF THE INVENTION

Natural originate particles (such as naturally occurring aggregates, sand, crushed natural rock, e.g., basalt rock, etc), and artificially originated particles (such as artificially created aggregates, crushed building waste, industrial wastage, etc.) are used for various filling purposes. Many of these particles are hydrophilic in nature, tending to absorb and hold water to a certain degree.

High water content of filling materials is an undesirable quality in general. Since environmental water/humidity levels change dramatically, a smaller water content of filler is a positive quality contributing to a more stable surrounding.

Many attempts to create hydrophobic particles have been made in the past. However, none of the prior attempts achieved a desired combination of hydrophobic qualities, manufacturing ease and low cost final product to enable extensive use of such products.

Chinese Patent Specification CN1124755 describes a granular, waterproof and insulating material for building, having a granularity less than 0.8 mm, and which is made up of ordinary fine sand or other granular material and a waxy substance as a hydrophobic agent through mixing while heating to 100–130° C. for 10–30 min followed by cooling, and features low cost, no toxicity and no environmental pollution.

Chinese Patent Specification CN124755 provides three examples of carrying out this process, all of them with a single wax. In one example, the main substance, fine yellow sand, is taken from the Tenger desert. A diameter of ≦0.6 mm is selected and paraffin wax fragments are used to obtain the following weight ratio: yellow sand 96%; paraffin wax 4%. These are fed together into the stirrer, heated to 110° C., and stirred for 15 minutes. The resulting material is discharged and cooled to form the finished product. In a second example, the ratio is yellow sand 98% and paraffin wax 2%. In a third example, the ratio is talcum powder 96% and paraffin wax 4%.

SUMMARY OF THE INVENTION

The present invention seeks to provide wax blends to render sand hydrophobic, as is described in detail further hereinbelow. It is noted that the terms hydrophobic, water repelling or resisting, and the like, are used interchangeably throughout. It is also noted that the terms melting point, softening point, congealing point and the like are used interchangeably throughout.

In accordance with a non-limiting embodiment of the present invention, hydrophobic sand is at least partially coated with a wax blend, wherein the first wax of the wax blend has a melting temperature in the range of from about 10° C. to about 85° C., and the second wax of the wax blend has a melting temperature in the range of from about 70° C. to about 125° C., wherein the difference in melting point between the first and second waxes is at least 10° C., the blend's first and second waxes ratio preferably being from about 100/1 to 1/1, and the wax blend load preferably ranging from about 0.01% to about 10% of treated sand weight.

In accordance with a non-limiting embodiment of the present invention, free flowing sand, preferably silica sand, may be turned hydrophobic by being at least partially coated with a wax blend by a controlled coating process. The wax blend/sand coating ratio (weight ratio of wax blend to total coated sand weight) may be in the range of about 0.01%–10%, preferably about 0.05%–3%, more preferably about 0.1%–2%.

The wax blend may include a weight ratio of about 50.01% to 99.99% of a main wax, and about 49.99% to 0.01% of a secondary wax. Preferable ratios are about 75% to about 99% of the main wax and about 25% to about 1% of the secondary wax. More preferable ratios are about 85%–98% of the main wax and about 2–15% of the secondary wax.

In accordance with an embodiment of the present invention, the main wax may include a soft macro-crystalline wax (preferably, but not limited to, a soft paraffin wax) with a congealing point in the range of about 10–45° C., a hard macro-crystalline wax (preferably, but not limited to, a paraffin wax) with a congealing point in the range of about 40–85° C., or a mixture thereof. Other macro-crystalline waxes such as plant/insect waxes (bee wax, carnauba wax, candelila wax, bayberry wax, Japan wax, etc.) and synthetic waxes (wax produced from a Fischer-Tropsch process, polyethylene wax, polypropylene wax, bitumen, tar, etc.), or any mixture thereof may be used as the main wax.

The secondary wax may include a hard or microcrystalline wax with a congealing point higher than 70° C., and preferably at least 10° C. higher than that of the main wax. The secondary wax is preferably montan wax with a congealing point in the range higher than 70° C. more preferably 75–85° C. Other hard micro-crystalline waxes, such as but not limited to, natural waxes (peat wax, castor wax, jojoba wax, etc.) and synthetic waxes (wax produced from a precipitation process, Fischer-Tropsch process, polyethylene wax, polypropylene wax, bitumen, tar, etc.) or any mixture thereof may be used as the secondary wax.

The wax blend may be in the form of an emulsion, suspension, solution, hot melt or solid (e.g. blocks, pellets, flakes, powder, etc.).

The hydrophobic sand may be obtained through any of the controlled coating processes described in detail further hereinbelow. The hydrophobic sand may be useful in a wide variety of applications as mentioned below.

DETAILED DESCRIPTION OF EMBODIMENTS

First definitions of terms are presented:

SAND—the term "sand" throughout the specification and claims encompasses all of the below definitions for sand, coarse sand and fine sand and any mixture thereof.

"Sand" encompasses the following:

a. A rock fragment or detrital particle smaller than a granule and larger than a coarse silt grain, having a diameter in range of 1/16 to 2 mm (62 to 2,000 am, or 0.0025 to 0.08 in, or 4 to 1 phi units, or a size between that at the lower limit of visibility of an individual particle with the unaided eye and that of the head of a small wooden match), being somewhat rounded by abrasion in the course of transport. In Great Britain, the range of 0.1 to 1 mm has been used.

b. A loose aggregate, unlithified mineral or rock particles of sand size; an unconsolidated or moderately consolidated sedimentary deposit consisting essentially of medium-grained clastics. The material is most commonly composed of quartz, and when the term sand is used without qualification, a siliceous composition is implied; but the particles may be of any mineral composition or mixture of rock or mineral fragments, such as coral sand. Also, sand encompasses a mass of such material, esp. on a beach, desert, or in a streambed.

"Coarse sand" encompasses the following:

a. A geologic term for a sand particle having a diameter in the range of 0.5 to 1 mm (1 to 0 phi units), and a loose aggregate of sand consisting of coarse sand particles.

b. An engineering term for a sand particle having a diameter in the range of 2 mm (retained on U.S. standard sieve No. 10) to 4.76 mm (passing U.S. standard sieve No. 4).

"Fine sand" encompasses the following:

a. A geologic term for a sand particle having a diameter in the range of 0.125 to 0.25 mm (125 to 250 μm, or 3 to 2 phi units), and a loose aggregate of sand consisting of fine sand particles.

b. An engineering term for a sand particle having a diameter in the range of 0.074 mm (retained on U.S. standard sieve No. 200) to 0.42 mm (passing U.S. standard sieve No. 40).

The terms are defined according to the U.S. Bureau of Mines *Dictionary of Mining, Mineral, and Related Terms.*

WAX—the term "wax" throughout the specification and claims encompasses any of the following:

Soft paraffin wax (also called "foot oil"), obtained from fossil fuel refining, melt temperature range 10–45° C. Paraffin soft wax may comprise up to 30% paraffin oil.

Macro crystalline paraffin wax, obtained from fossil fuel refining, melt temperature range 40–75° C. Macro crystalline paraffin wax may be "fully refined" (comprising less than 1% paraffin oil), "scale wax" (comprising up to 5% paraffin oil) or "slack wax" (comprising up to 30% paraffin oil).

Fisher-tropsch wax, made by reacting carbon monoxide and hydrogen under the influence of a catalyst, melt temperature range 40–75° C. or 65–125° C.

Montan wax, obtained from lignite coal, melt temperature range 65–125° C.

Micro crystalline paraffin wax, obtained from fossil fuel refining, melt temperature range 65–125° C. Micro crystalline paraffin wax may be "fully refined" (comprising less than 1% paraffin oil), "scale wax" (comprising up to 5% paraffin oil) or "petrolatum wax" (comprising up to 30% paraffin oil).

Natural originated plant/insect wax such as but not limited to bee wax, carnauba wax, candelila wax, bayberry wax, Japan wax, soy wax, and others.

Synthetic originated wax, such as but not limited to polyethylene wax, polypropylene wax, and others.

The term "wax blend" means:

A blend of at least one main wax with at least one secondary wax formed by dissolving one in the other, obtained by mixing the waxes at a temperature higher than their melting points. In a wax blend the secondary wax may be dissolved in the main wax. Melting point temperature difference between main and secondary wax is at least 10° C.

The following are some clarifications concerning the nature of wax blend and the material difference between wax blend and single wax:

One would expect that a blend which is a combination of a certain "wax A" and a certain "wax B" will result in a "wax blend C" and that this "wax blend C" will affect the treated sand by some kind of average of the performances of the two wax types (A and B) such that the more wax A is used in the blend it will behave more like wax A and the more wax B is used in the blend it will behave more like wax B. In other words, if adding "wax A" results in improvement "M" and adding "wax B" results in improvement "N", then one would expect that the addition of both of them would result in improvement which is the sum of "N+M".

However, the inventors have surprisingly found that this is not the case when sand is treated with wax blends. In the examples of experiments given below it is clear that the use of a wax blend results in a synergistic effect of the two types of wax. This synergy provides advantages that may not be achieved in any other manner. The wax blend enhances certain characteristics of each of the wax types, but not in the manner one would normally predict.

Although the invention is not limited to any theory, nevertheless the following is a non-limiting explanation of the differences between a single wax and wax blend that may explain the surprising results of the invention. Waxes vary in crystalline structure with molecular weight. The lower melting (soft) waxes tend to have large plate-like crystals while higher melting (hard) waxes tend to have needle shape crystals. If the molecular weight is sufficiently high, the wax tends to be amorphous in nature. This is because the molecular structure is changing as well. The lower molecular weight waxes are mostly normal paraffin compounds and as molecular weight increases, the wax has less normal paraffin molecules and more isoparaffinic and ring compounds are present. When relatively soft waxes are blended with other relatively hard waxes, the result is a crystalline structure that can be very different than both single waxes. The wax blend changes the molecular structure and thus the crystalline structure and ultimately the performance of the material used in a given application. A single wax may not have a crystalline structure that provides the desired performance characteristic defined in the application. Wax blends are different than a single wax in structure and thus provide differences in performance characteristics than a single wax.

The differences may manifest themselves in a variety of qualities such as appearance, strength, opacity, hydrophobicity, adhesiveness, cohesiveness, chemical resistance and others. Crystallization phenomena may explain the synergistic improvement of certain desired qualities (e.g., hydrophobicity, adhesion to sand, etc.) while maintaining other qualities desirably unchanged (e.g., processability, appearance, etc).

Hard waxes tend to be more expensive, more hydrophobic, less adhesive and less processable than soft waxes. Wax blends that include a soft main wax and a hard secondary wax may enhance the desired qualities of both constituent waxes, which can not be found in each of the ingredients alone, in order to obtain a feasibly economical hydrophobic sand.

The main wax may include any of the following, either singly or in any combination thereof:

Soft paraffin wax, melt temperature range 10–45° C.

Macro crystalline paraffin wax, melt temperature range 40–75° C.

Fisher-tropsch wax, melt temperature range 40–75° C.

Plant/insect wax, temperature range 40–75° C.

The secondary wax may include any of the following, either singly or in any combination thereof:

Montan wax, melt temperature range 65–125° C.

Micro crystalline paraffin wax, melt temperature range 65–125° C.

Fisher-tropsch wax, melt temperature range 65–125° C.

Plant/insect wax, melt temperature range 65–125° C.

Synthetic wax, melt temperature range 65–125° C.

The wax blend may be in the form of an emulsion, suspension, solution, hot melt or solid (e.g. blocks, pellets, flakes, powder, etc.).

A "wax solution" is a homogenous liquid of miscible materials in which wax is dissolved in a solvent.

A "wax emulsion" is a stable dispersion of immiscible materials. It is noted that wax in water emulsions uses emulsifiers to maintain stability. The emulsifiers prevent the wax particles from adhering to or merging with themselves.

A "wax suspension" is a buoyant dispersion of immiscible materials. It is noted that wax in water (or water in wax) suspensions necessitate constant agitation without which the wax particles will rapidly merge to form a continuous wax phase and a separate continuous water phase.

A hot melt is a liquefied form of wax blend attainable by heating it above melting/congealing/softening temperature which is higher than ambient temperature. Wax blend hot melt may be added to the sand by pouring, spraying, misting, etc.

"Mixing" encompasses adding, partial coating, coating, dissolving, pouring, or any other action to distribute the wax blend homogenously within the sand.

Hydrophobic sand is obtained through a controlled process by at least partially coating the sand with a wax blend. Through the controlled process the wax blend adheres to the sand particles at least partially coating them. The hydrophobic sand is a free flowing material where individual particles are at least partially coated sand particles. The wax blend coating render the sand particles hydrophobic, but is not a binder able to fuse sand particles one to the other to create a solid mass.

The sand may be treated or coated, without limitation, by any of the following, singly or in combination thereof:

a. Melt coating (sand and wax blend are mixed at temperatures higher than the wax blend melting point). For example, both the wax and sand may be heated and blended together at temperatures higher than the wax blend melting point; pre-heated, molten wax may be poured/sprayed on pre-heated sand, or hot wax suspension or wax emulsion, may be poured/sprayed on pre-heated sand; wax may be coated on pre-heated sand, wherein the sand heats the wax to or above its melting point, etc.

b. Liquid coating (sand at ambient temperature is mixed with liquid wax blend in molten state, e.g., suspension, emulsion, solution or spray/mist form)

c. Cold coating (sand at ambient temperature is mixed with solid wax blend in powder, particles dispersion or emulsion form)

Coating sand with the wax blend may be controlled by controlling parameters, such as but not limited to, the following:

a. Type of main and secondary wax (e.g., soft, hard, etc)

b. Wax main/secondary ratio c. Wax blend/Sand ratio d. Temperature of wax blend, sand and/or mixture e. Type of wax application (pour, spray, etc)

f. Type, speed and duration of mixer and mixing (sheer and agitation)

Hydrophobic sand may be useful in a wide variety of applications. For example, and without limitation, hydrophobic sand may be used as joint sand between interlocking bricks/pavers/cinder blocks/etc. The hydrophobic sand may have many advantages over regular sand, e.g., it may save the need for sand sealers, it may save the need for sand stabilizers, it may inhibit weed growth, it may inhibit washout by rain/wash water, it may enable laying pavement in dump/soaked weather conditions, and it may enable laying pavement in freezing weather conditions. Since joint sand is susceptible to extreme temperature differences and wind abrasion forces, the treated blend should enhance tackiness at high melting points. Hydrophobicity of joint sand is not necessarily total and the hydrophobization level can be controlled.

Hydrophobic sand may be used as bedding sand underneath pavers, roads, surfaces, etc. The hydrophobic sand may have many advantages over regular sand, e.g., it may inhibit water migration through the bedding layers, it may enable laying beddings in dump/soaked weather conditions, it may be unsusceptible to freeze/thaw cycles, and it may enable laying pavement in freezing weather conditions. Bedding temperature and abrasion variations are less severe than those of joint sand. However, excellent hydrophobicity is important.

Hydrophobic sand may be used as a hydrophobic layer around, underneath or above underground objects (pipes, tanks, cables, construction bases, poles, electronic devices, etc.). The hydrophobic sand may have many advantages over regular sand/gravel filling, e.g., it may be unsusceptible to freeze/thaw cycles, and it may enable easy clearing (for purposes such as maintenance of the underground object) and replacing even under wet and/or frozen weather conditions. An important quality of such sand is its ability to be easily removed and replaced at any weather conditions. Another important quality of such sand is the reduction of water contact with metallic underground objects. Such reduction may result as major corrosion inhibition. Another important quality of such sand is the reduction of water contact with underground electronic objects. Such reduction may result as major electrical insulation and corrosion inhibition. Specific blend for such sand will vary with geographic locations. Arctic areas might best use softer mixes. Equatorial areas might best use harder mixes.

Hydrophobic sand may be used as a hydrophobic layer in ponds/pits. The hydrophobic sand may have many advantages, e.g., it may replace clay soil layers, it may not require extensive compaction, it may not swell when in contact with water and it may not shrink when dry (does not develop shrinking cracks as clay soils). It is noted that waste pits are sealed below and above the waste. High hydrophobicity is an important quality of hydrophobic layers. In such applications, temperature variations are generally small due the insulation effect of the pond/pit and therefore affect the type of preferred wax blend for implementation. Additional advantage over the use of clays or clay soils (which are widely used to seal ponds, pits, reservoirs and waste pits), is that the sand according to the present invention is less sensitive to moisture variations which can cause contraction cracks. Such cracks may cause the failure of structural integrity permitting the content to leak out to the surrounding environment. Even a small hole can cause significant environmental contamination.

Hydrophobic sand may be used as a sealer of pond/reservoir leakage (which is a significant problem with both economical and environmental aspects). Existing methods require emptying the ponds or using very expensive and complicated techniques in order to seal such leaks. Placing hydrophobic sand above such leak location will result with the seal of the leak. The hydrophobic sand may have many advantages over existing methods, e.g., it may be easy to use, efficient and cheap and it may not require emptying of the reservoir. Flow ability and hydrophobicity are the important qualities of such hydrophobic sand application. Preferred mix will be coarse sand treated with wax blend of excellent hydrophobicity.

Hydrophobic sand may be used as a hydrophobic layer around buildings, basements, cellars, poles or other partially buried objects. The hydrophobic sand may have many advantages over existing methods, e.g., it may be easy to use, efficient and cheap, may inhibit weed growth, it may inhibit washout by rein/wash water, it may inhibit corrosion of metals, and it may enable easy clearing and replacing even under wet and/or frozen weather conditions. The most important quality of such sand is its ability to be easily removes and replaced at any weather conditions. Specific blend for such sand will vary with geographic locations. Arctic areas might best use softer mixes. Equatorial areas might best use harder mixes).

The invention may be better understood from the following non limiting examples in which:

Example 1 compares hydrophobicity of sands treated by "liquid coating" of hard/montan wax suspensions of varying main/secondary wax ratios and varying wax loads.

Example 2 compares hydrophobicity of sands treated by "liquid coating" of soft/montan wax suspensions of varying main/secondary wax ratios and varying wax loads.

Example 3 compares hydrophobicity of sands treated by "melt coating" of soft/montan wax of varying main/secondary wax ratios and varying wax loads.

Example 4 compares hydrophobicity of sands treated by "melt coating" of soft/microcrystalline wax of varying main/secondary wax ratios and varying wax loads.

In all the examples, the "drop test" is conducted according to the following procedure: On 10 mm thick sand layer, 4 separate drops of water were dropped. The time for drop absorption was measured and reported as the mean of the 4 drops. The following hydrophobic grades were given:

Bad—absorption time less than 1 second;
Poor—absorption time 1–5 seconds;
Fair—absorption time 5–60 seconds;
Medium—absorption time 1–5 minutes;
Good—absorption time 5–60 minutes;
Excellent—water drop does not absorb.

EXAMPLE 1

10 kg of sand were agitated at room temperature with various quantities of wax blend suspension in a drum mixer at ambient temperature. (liquid coating)

Main wax was paraffin wax of congealing point 59° C. Secondary wax was montan wax of congealing point 82° C. Suspension of various waxes were prepared and added at different dosages to 10 kg batches of sand. Method of suspension preparation was as follows: A dissolver stirrer of 65 mm diameter rotates at 2000 rpm in a 10 liter heated container. 3 kg of waxes at ratios according to table 1 were melted, heated to 95° C., and dissolved together for 10 minutes creating a homogenous wax blend. The dissolver was stopped and 6 kg of water at 90° C. were added to the container, creating a layer of wax blend floating on the water in stirrer's container. The dissolver was turned on creating a "wax in water" suspension for as long as it is rotating. Without stopping the dissolver, appropriate quantities of wax suspension were poured from the dissolver's container to the rotating drum mixer containing 10 kg of sand. "Wax addition" of table 1 below refer to wax solids (e.g., 1.5% means 450 grams of suspension was poured on 10 kg of sand. 450 grams suspension comprises 150 grams of wax/wax blend finely minuted and suspended in 300 grams of water). The drum mixer rotated at 30 RPM for 10 minutes mixing the sand and wax suspension. The resultant mixture is free flowing partially coated sand exhibiting hydrophobic nature.

The following table lists the obtained "water drop absorption" test results sorted by hydrophobic result:

TABLE 1

| Mix number | Blend ratio | Wax addition to sand [% weight] | Hydrophobic result |
|---|---|---|---|
| reference | Untreated sand | 0 | bad |
| 1 | Single wax | 0.8 | Poor |
| 2 | Single wax | 1.5 | Fair |
| 3 | Single wax | 2.5 | Medium |
| 4 | Blend ratio 1:20 | 0.8 | Medium |
| 5 | Blend ratio 1:20 | 1.5 | Medium |
| 6 | Blend ratio 1:20 | 2.5 | Good |
| 7 | Blend ratio 1:10 | 0.8 | Good |
| 8 | Blend ratio 1:10 | 1.5 | Good |
| 9 | Blend ratio 1:10 | 2.5 | Excellent |

From example 1 one can see the substantial benefit of the wax blend on hydrophobic quality of treated sand, as opposed to a single wax: A blend ratio of 1:20 enables mix 4 (treated with 0.8% wax blend) to have an equivalent hydrophobic performance to that of mix 3 which was treated with three times as much (2.5%) of single wax.

A blend ratio of 1:10 enables mix 7 (treated with 0.8% wax blend) to have an equivalent hydrophobic performance of mix 6 treated with three times as much (2.5%) of a blend ratio 1:20.

The ability to reduce the amount of wax used for treatment for a given hydrophobicity when using a wax blend as opposed to a single wax has substantial economical effect. Furthermore, it was surprisingly found that blends of secondary microcrystalline waxes in main soft/hard waxes had synergistic effect in emphasizing desired improved hydrophobicity while masking undesirable qualities such as brittleness, flow, and reduced tackiness of microcrystalline waxes.

The above example also shows that according to preferred embodiments of the present invention, a hydrophobic sand may optionally and preferably be provided, comprising sand at least partially coated with a wax blend, the wax blend comprising a main wax and a secondary wax, wherein the secondary wax has a melting temperature at least about 10 degrees centigrade higher than a melting temperature of the main wax, wherein the wax blend is provided in an amount about one-half, more preferably about one third, of an amount of the main wax alone required to provide an equivalent hydrophobicity.

EXAMPLE 2

10 kg of sand were agitated at room temperature with various quantities of wax blend the same as example 1. Main wax was soft paraffin wax of congealing point 39° C. Secondary wax was montan wax which had a congealing point of 82° C.

The resultant mixture is free flowing partially coated sand exhibiting hydrophobic nature.

The following table lists the obtained "water drop absorption" test results sorted by hydrophobic result:

TABLE 2

| Mix number | Blend ratio | Wax addition to sand [% weight] | Hydrophobic result |
|---|---|---|---|
| reference | Untreated sand | 0 | bad |
| 10 | Single wax | 0.8 | Poor |
| 11 | Single wax | 1.5 | Poor |
| 12 | Single wax | 2.5 | Fair |
| 13 | Blend ratio 1:20 | 0.8 | Fair |
| 14 | Blend ratio 1:20 | 1.5 | Fair |
| 15 | Blend ratio 1:20 | 2.5 | Medium |
| 16 | Blend ratio 1:10 | 0.8 | Medium |
| 17 | Blend ratio 1:10 | 1.5 | Medium |
| 18 | Blend ratio 1:10 | 2.5 | Good |

From example 2 one can see the substantial benefit of soft wax blend on hydrophobic quality of treated sand: A blend ratio of 1:20 enables mix 13 (treated with 0.8% wax blend) to have an equivalent hydrophobic performance of mix 12 treated with three times as much wax (2.5%) of single wax.

A blend ratio of 1:10 enables mix 16 (treated with 0.8% wax blend) to have an equivalent hydrophobic performance of mix 15 treated with three times as much wax (2.5%) of a blend ratio 1:20.

The ability to reduce the amount of wax used for treatment for a given hydrophobicity when using a wax blend as opposed to a single wax has substantial economical effect. Furthermore, it was surprisingly found that blends of secondary microcrystalline waxes in main soft/hard waxes had synergistic effect in emphasizing desired improved hydrophobicity while masking undesirable qualities such as brittleness, flow, and reduced tackiness of microcrystalline waxes.

The above results also show that softer waxes (i.e., waxes with a lower melting temperature) receive an even greater benefit in being mixed as part of a blend, as the softer wax above exhibited poorer results alone (as a single wax) for treating sand than the harder paraffin wax of Example 1. The wax in this example is a soft macrocrystalline wax (having a melting temperature of from about 10 to about 45° C.) while the wax in the previous example was a hard macrocrystalline wax (having a melting temperature of from above 40 to about 85° C.

EXAMPLE 3

500 grams of sand "melt coated" were prepared in the following way: Sand batches were agitated with various quantities of waxes and wax blends in a laboratory tilted drum mixer at a rate of 60 rpm. An external heat source heated the drum, sand and wax to 95° C.±5° C. within 15 minutes, melting the wax. The mixer continued agitating for 30 minutes at temperature of 95° C.±5° C., after which the heat source was turned off. The mixer continued agitating for 15 more minutes while the contained partially coated sand cooled to below wax's melting point.

The main wax was soft paraffin wax with a congealing point of 39° C. The secondary wax was montan wax with a congealing point of 79° C.

The resultant treated sand is free flowing and exhibits hydrophobic nature.

The following tables list the obtained "water drop absorption" test results obtained:

Table 3—results listed by blends and additions

Table 4—excerpted results from table 3 demonstrating blend hydrophobic advantage Table 5—excerpted results from table 3 demonstrating blend hydrophobic synergistic advantage

TABLE 3

| Mix number | Blend ratio | Wax addition to sand [% weight] | Hydrophobic result |
|---|---|---|---|
| Reference | Untreated sand | 0 | bad |
| 112 | Single paraffin wax | 0.2 | Bad |
| 22 | Single paraffin wax | 0.3 | Poor |
| 23 | Single paraffin wax | 0.4 | Poor |
| 24 | Single paraffin wax | 0.6 | Poor |
| 25 | Single paraffin wax | 0.8 | Fair |
| 26 | Single paraffin wax | 1.2 | Medium |
| 27 | Single paraffin wax | 1.8 | Medium |
| 110 | Blend ratio 1:20 | 0.2 | Poor |
| 111 | Blend ratio 1:20 | 0.4 | Fair |
| 20 | Blend ratio 1:20 | 0.6 | Medium |
| 118 | Blend ratio 1:10 | 0.2 | Poor |
| 120 | Blend ratio 1:10 | 0.4 | Fair |
| 121 | Blend ratio 1:10 | 0.6 | Good |
| 122 | Blend ratio 1:4 | 0.2 | Fair |
| 124 | Blend ratio 1:4 | 0.4 | Medium |
| 125 | Blend ratio 1:4 | 0.6 | Good |
| 126 | Blend ratio 1:1 | 0.2 | Medium |
| 128 | Blend ratio 1:1 | 0.4 | Good |
| 129 | Blend ratio 1:1 | 0.6 | Excellent |
| 114 | Single montan wax | 0.2 | Medium |
| 116 | Single montan wax | 0.3 | Good |
| 117 | Single montan wax | 0.4 | Excellent |

TABLE 4 excerpted results from table 3 demonstrating blend hydrophobic advantage

| Mix number | Blend ratio | Wax addition to sand [% weight] | Hydrophobic result |
|---|---|---|---|
| 25 | Single paraffin wax | 0.8 | Fair |
| 111 | Blend ratio 1:20 | 0.4 | Fair |
| 122 | Blend ratio 1:4 | 0.2 | Fair |
| 27 | Single paraffin wax | 1.8 | Medium |
| 20 | Blend ratio 1:20 | 0.6 | Medium |
| 124 | Blend ratio 1:4 | 0.4 | Medium |
| 121 | Blend ratio 1:10 | 0.6 | Good |

From table 4 one can see the substantial benefit of soft wax blend (melt coating) on hydrophobic quality of treated sand: A blend ratio of 1:20 enables mix 111 (treated with 0.4% wax blend) to have an equivalent hydrophobic performance of mix 25 doubly treated with 0.8% of single wax. A blend ratio of 1:4 enables mix 122 (treated with 0.2% wax blend) to have an equivalent hydrophobic performance of mix 25 quadruply treated with 0.8% of single wax. A blend ratio of 1:20 enables mix 20 (treated with 0.6% wax blend) to have an equivalent hydrophobic performance of mix 27 triply treated with 1.8% of single wax. A blend ratio of 1:4 enables mix 124 (treated with 0.4% wax blend) to have an equivalent hydrophobic performance of mix 27 quadruply treated with 1.8% of single wax. A blend ratio of 1:10 enables mix 121 (treated with 0.6% wax blend) to outperform hydrophobic performance of mix 27 triply treated with 1.8% of single wax.

TABLE 5 excerpted results from table 3 demonstrating blend hydrophobic synergistic advantage

| Mix number | Blend ratio | Wax addition to sand [% weight] | Hydrophobic result |
|---|---|---|---|
| 112 | Single paraffin wax | 0.2 | Bad |
| 114 | Single montan wax | 0.2 | Medium |
| expected | Blend ratio 1:1 | 0.4 | Medium |
| 128 | Blend ratio 1:1 | 0.4 | Good |
| 22 | Single paraffin wax | 0.3 | Poor |
| 116 | Single montan wax | 0.3 | Good |
| expected | Blend ratio 1:1 | 0.6 | good |
| 129 | Blend ratio 1:1 | 0.6 | Excellent |

Table 5 shows the synergism of wax blend as opposed to single wax. (It is noted that treating sand with a single microcrystalline wax is feasible in laboratory only mainly because of the low adhesion between sand and microcrystalline wax):

From table 5 one can see that the expected hydrophobicity of treating sand first with 0.2% of single main wax and than with 0.2% of single secondary wax is expected to result in "medium", based on the additive properties of the single waxes (it should be noted that the result of mix 112 was "bad" which is less than 1 second hence contributing very little hydrophobic quality). However, the result of mix 128, which is a blend made from the same ingredients, was "good", providing a stronger result than expected, due to synergism between the wax properties.

From table 5 one can see that the expected hydrophobicity of treating sand first with 0.3% of single main wax and than with 0.3% of single secondary wax is expected to result in "good", based on the additive properties of the single waxes (it should be noted that the result of mix 22 was "poor" which is 1 to 5 seconds, hence contributing just a little hydrophobic quality). However mix 129, which is a blend made from the same ingredients, resulted in "excellent" providing a stronger result than expected, due to synergism between the wax properties.

EXAMPLE 4

400 grams of fine sand was "melt coated" the same way as example 3.

Main wax was soft paraffin wax of congealing point 39° C. Secondary wax was paraffin microcrystalline wax of congealing point of 77° C.

The resultant treated sand is free flowing and exhibits hydrophobic nature.

The following tables list the obtained "water drop absorption" test results obtained:

Table 6—results listed by blends and additions
Table 7—excerpted results from table 3 demonstrating blend hydrophobic advantage
Table 8—excerpted results from table 3 demonstrating blend hydrophobic synergistic advantage

TABLE 6

| Mix number | Blend ratio [% secondary wax of total wax] | Wax addition to sand [% weight] | Hydrophobic result |
|---|---|---|---|
| 46 reference | Untreated sand | 0 | bad |
| 164 | Single paraffin wax | 1.0 | Poor |
| 165 | Single paraffin wax | 2.0 | Fair |
| 166 | Single paraffin wax | 3.0 | Medium |
| 60 | Blend ratio 1:20 | 1.0 | Fair |
| 61 | Blend ratio 1:20 | 2.0 | Medium |
| 62 | Blend ratio 1:20 | 3.0 | Medium |
| 63 | Blend ratio 1:10 | 1.0 | Fair |
| 64 | Blend ratio 1:10 | 2.0 | Medium |
| 65 | Blend ratio 1:10 | 3.0 | Good |
| 89 | Blend ratio 1:4 | 1.0 | Medium |
| 90 | Blend ratio 1:4 | 2.0 | Good |
| 91 | Blend ratio 1:4 | 3.0 | Good |
| 92 | Blend ratio 1:1 | 1.0 | Medium |
| 93 | Blend ratio 1:1 | 2.0 | Good |
| 94 | Blend ratio 1:1 | 3.0 | Good |
| 74 | Single microcrystalline wax | 0.5 | Fair |
| 73 | Single microcrystalline wax | 1.0 | Medium |
| 71 | Single microcrystalline wax | 2.0 | Good |
| 72 | Single microcrystalline wax | 3.0 | Good |

TABLE 7 excerpted results from table 6 demonstrating blend hydrophobic advantage

| Mix number | Blend ratio | Wax addition to sand [% weight] | Hydrophobic result |
|---|---|---|---|
| 166 | Single paraffin wax | 3.0 | Medium |
| 61 | Blend ratio 1:20 | 2.0 | Medium |
| 89 | Blend ratio 1:4 | 1.0 | Medium |

From table 7 one can see the substantial benefit of soft wax blend (melt coating) on hydrophobic quality of treated sand: A blend ratio of 1:20 enables mix 61 (treated with 2.0% wax blend) to have an equivalent hydrophobic performance of mix 166 treated with 3.0% of single wax. A blend ratio of 1:4 enables mix 89 (treated with 1.0% wax blend) to have an equivalent hydrophobic performance of mix 166 triply treated with 3.0% of single wax.

TABLE 8 excerpted results from table 6 demonstrating blend hydrophobic synergistic advantage

| Mix number | Blend ratio | Wax addition to sand [% weight] | Hydrophobic result |
|---|---|---|---|
| 165 | Single paraffin wax | 2.0 | Fair |
| 74 | Single microcrystalline wax | 0.5 | Fair |
| expected | Blend ratio 1:4 | 2.5 | Fair |
| 90 | Blend ratio 1:4 | 2.0 | Good |
| 164 | Single paraffin wax | 1.0 | Poor |
| 73 | Single microcrystalline wax | 1.0 | Medium |
| expected | Blend ratio 1:1 | 2.0 | medium |
| 93 | Blend ratio 1:1 | 2.0 | Good |

Table 8 shows the synergism of wax blend as opposed to single wax. (It is noted that treating sand with a single microcrystalline wax is feasible in laboratory only mainly because of the low adhesion between sand and microcrystalline wax):

From table 8 one can see that the expected hydrophobicity of treating sand first with 2.0% of single main wax and then with 0.5% of single secondary wax is expected to result in "fair", based on the additive properties of the single waxes (it should be noted that the results of mix 165 and mix 74 were "fair", which is 5 to 60 seconds, hence the equivalent of their maximum value is 120 seconds). However mix 90, which is a blend made from the same ingredients (and even with less quantities), resulted in "good", providing a stronger result than expected due to synergism between the wax properties.

From table 8 one can see that the expected hydrophobicity of treating sand first with 1.0% of single main wax and than with 1.0% of single secondary wax is expected to result in "medium", based on the additive properties of the single waxes (it should be noted that the result of mix 164 was "poor" which is 1 to 5 seconds, hence contributing just a little hydrophobic quality). However mix 93 which is a blend made from the same ingredients, resulted in "good", providing a stronger result than expected due to synergism between the wax properties.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. A method for making hydrophobic sand comprising:
   coating sand with a wax blend so as to form an at least partially coated sand with advanced hydrophobic properties, wherein a weight ratio of the wax blend to total coated sand weight is about 0.05%–10%, and the wax blend includes a weight ratio of about 50.01% to 99.99% of a main wax, and about 49.99% to 0.01% of a secondary wax, wherein the at least partially coated sand is a free flowing material and the wax blend is not a binder that fuses the sand from being free flowing.

2. The method according to claim 1, wherein the wax blend includes a weight ratio of about 75% to 99% of the main wax, and about 25% to 1% of the secondary wax.

3. The method according to claim 1, wherein the wax blend includes a weight ratio of about 85%–98% of the main wax, and about 2–15% of the secondary wax.

4. The method according to claim 1, wherein said main wax comprises a soft macro-crystalline wax with a congealing point of about 10–45° C.

5. The method according to claim 1, wherein said main wax comprises a hard macro-crystalline wax with a congealing point of about 40–85° C.

6. The method according to claim 1, wherein said main wax comprises at least one of paraffin wax, bee wax, carnauba wax, candelila wax, bayberry wax, Japan wax, Fischer-Tropsch process wax, polyethylene wax, polypropylene wax, bitumen, and tar.

7. The method according to claim 1, wherein said secondary wax comprises a microcrystalline wax with a congealing point higher than about 70° C.

8. The method according to claim 7, wherein said secondary wax comprises a microcrystalline wax with a congealing point at least 10° C. higher than that of the main wax.

9. The method according to claim 1, wherein said secondary wax comprises montan wax with a congealing point higher than 70° C.

10. The method according to claim 1, wherein said secondary wax comprises at least one of peat wax, castor wax, jojoba wax, a paraffin precipitation process wax, Fischer-Tropsch process wax, polyethylene wax, and polypropylene wax.

11. The method according to claim 1, wherein said wax blend comprises at least one of an emulsion, a suspension, a solution, a dispersion, a hot melt, and solid form.

12. An article comprising sand at least partially coated with a wax blend so as to form an at least partially coated sand with advanced hydrophobic properties, wherein a weight ratio of the wax blend to total coated sand weight is about 0.05%–10%, and the wax blend includes a weight ratio of about 50.01% to 99.99% of a main wax, and about 49.99% to 0.01% of a secondary wax, wherein the at least partially coated sand is a free flowing material and the wax blend is not a binder that fuses the sand from being free flowing.

* * * * *